(No Model.)
2 Sheets—Sheet 1.
J. W. MORTON.
MACHINE FOR THE MANUFACTURE OF CORDAGE.
No. 303,943. Patented Aug. 19, 1884.
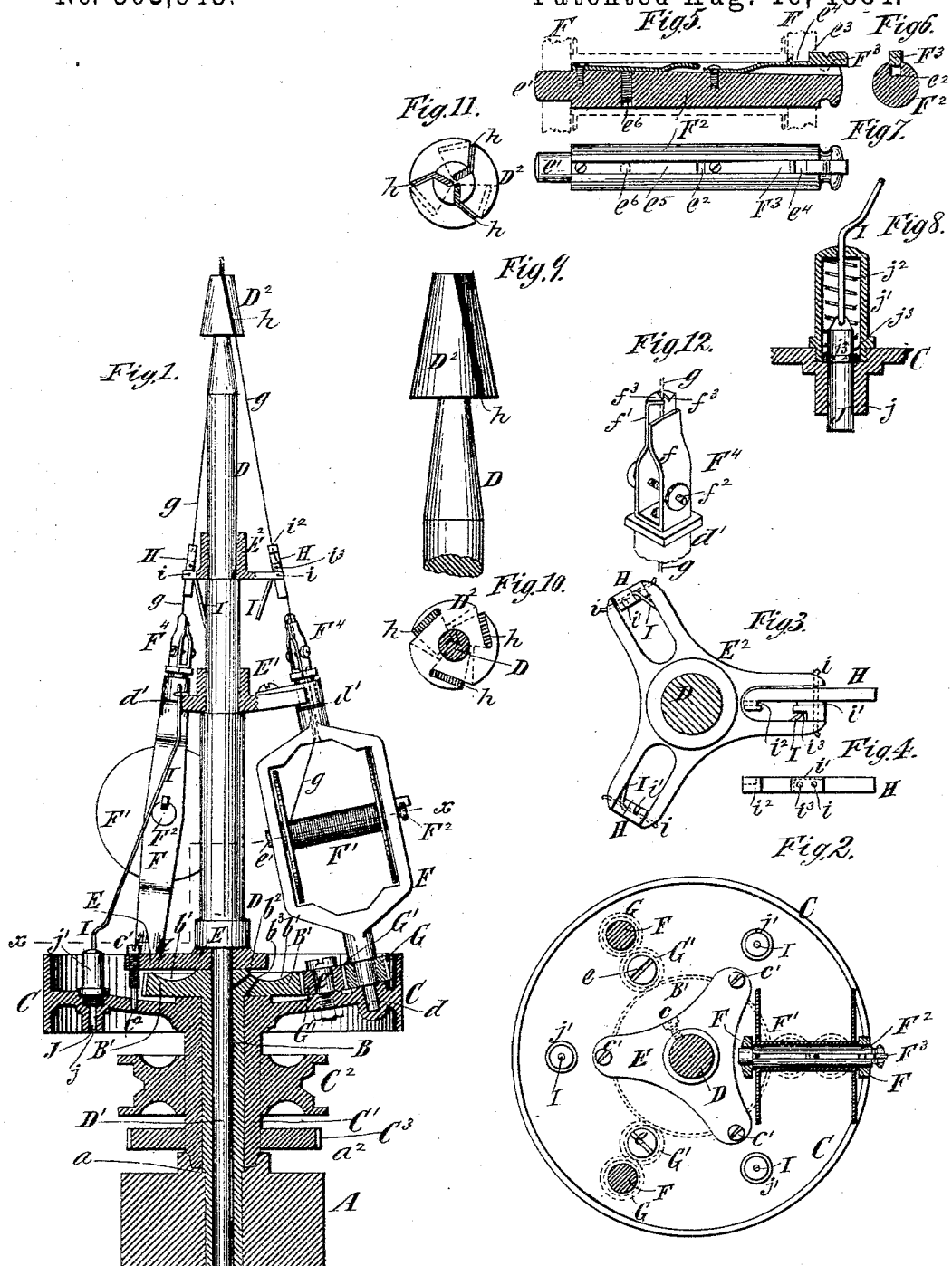
Witnesses
Fred K Haynes
Ed. L. Moran
Inventor
Joseph W Morton
by his Attorneys
Brown & Brown

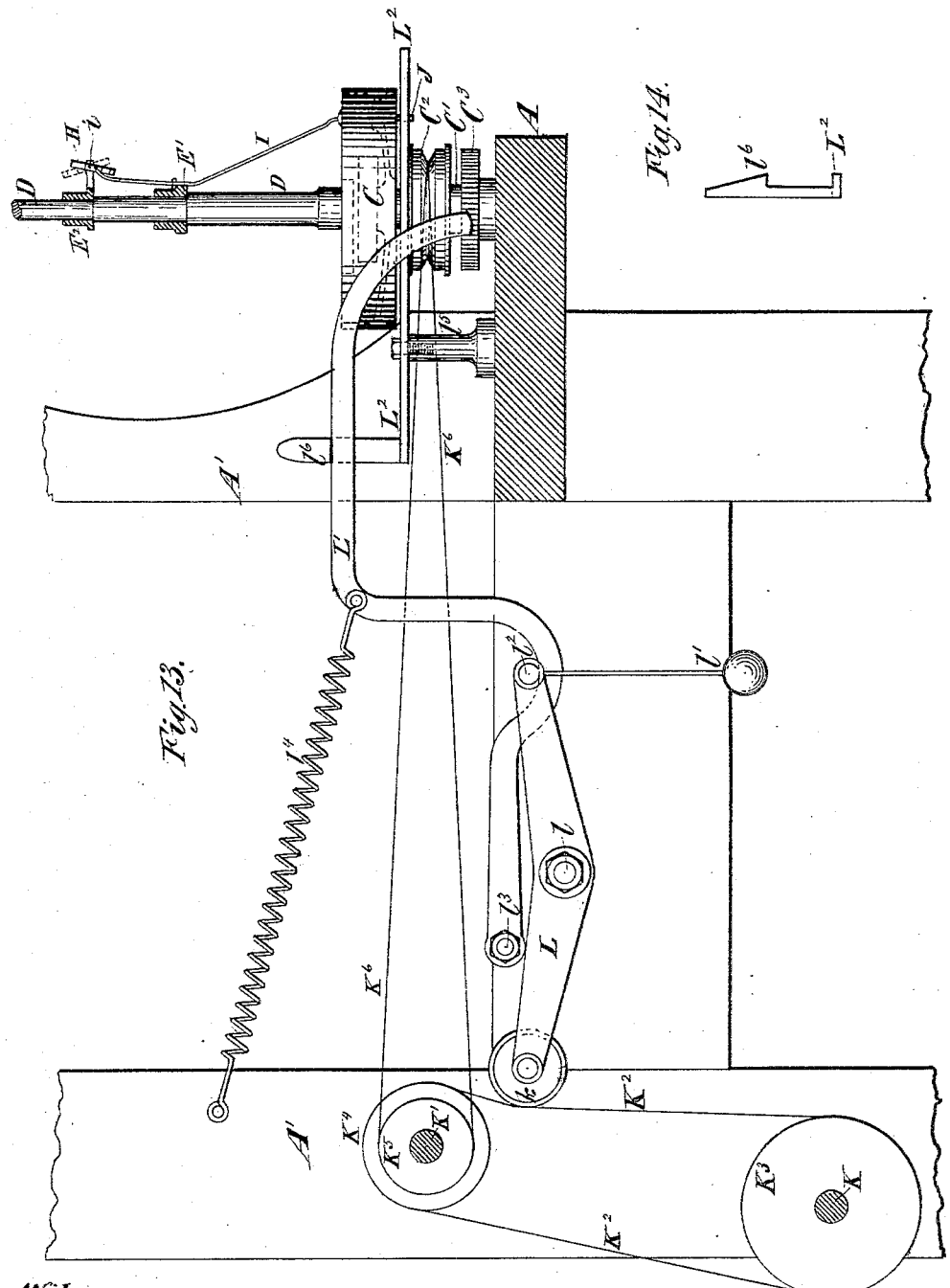

UNITED STATES PATENT OFFICE.

JOSEPH W. MORTON, OF WESTERLY, RHODE ISLAND, ASSIGNOR OF ONE-HALF TO CALVERT B. COTTRELL, OF SAME PLACE.

MACHINE FOR THE MANUFACTURE OF CORDAGE.

SPECIFICATION forming part of Letters Patent No. 303,943, dated August 19, 1884.

Application filed July 14, 1883. (No model.)

*To all whom it may concern:*

Be it known that I, JOSEPH W. MORTON, of Westerly, in the county of Washington and State of Rhode Island, have invented a new and useful Improvement in Machines for the Manufacture of Cordage, of which the following is a specification.

My invention relates to a machine which comprises a rotary main spindle and strand-fliers, which severally rotate independently to twist strands, and which also revolve with the main spindle to lay the strands to form a cord, the strand-fliers having what is known as a "planetary motion."

The invention consists in the combination, with the spindle-rail, of a tube or hollow post secured therein, a sun or central wheel fixed on the upper end of said tube or post, a center or main spindle having a long bearing within said tube or post, a spindle-base fitting and adapted to rotate on the exterior of said tube or fixed post, a wheel connected with said spindle, a base for rotating it, strand-fliers supported in the spindle-base and provided with planet-wheels, and intermediate wheels gearing with the sun and planet wheels, all as more fully hereinafter described. In the above combination the strand-fliers preferably converge toward their upper ends, or are inclined relatively to the center or main spindle.

The invention also consists in a novel means of connecting the main or center spindle and the spindle-base, so that they will rotate together without any vibration of the spindle-base being communicated to the spindle, and allowing of the spindle being readily drawn outward and upward from its bearing and away from the spindle-base.

The invention also consists in the combination, with the tube or fixed post, the main spindle and spindle-base having their bearings in and upon said tube or post, and mechanism for rotating said spindle and spindle-base, of a sun-wheel fixed at the upper end of the tube or post, and having an oil-cup in its upper surface and oil-holes leading therefrom to the interior and exterior of said tube or post.

The invention also consists in the combination, with a flier and a spool or bobbin, of a non-rotary pin extending transversely across the flier, on which the spool or bobbin is journaled, and which is provided with a longitudinal groove, and a spring lying in said groove and forming a brake to the spool or bobbin, as more fully hereinafter described.

The invention also consists in the combination, with the above described flier, spool, or bobbin, grooved pin, and brake-spring, of a screw inserted through the pin and bearing against the brake-spring, said screw being capable of adjustment to vary the power of the brake-spring.

The invention also consists in the combination, with a flier and a spool or bobbin, of a non-rotary pin extending transversely across the flier, on which the spool or bobbin is journaled, and which is provided with a longitudinal groove, and a spring-catch secured in said groove and engaging with the flier to prevent longitudinal movement of the pin therein, as more fully hereinafter described.

The invention also consists in a novel automatic stop mechanism, hereinafter described, for stopping the machine on the breaking of one of the strands.

In the accompanying drawings, Figure 1 is a vertical section of a machine embodying my invention, without the driving and stop mechanism. Fig. 2 is a horizontal section of the same in the plane of the dotted line $x\ x$, Fig. 1. Fig. 3 is a transverse section of the spindle and a plan of a portion of the stop mechanism. Fig. 4 is a detail view of a part of the stop mechanism. Fig. 5 is a longitudinal section of a spool or bobbin pin, with portions of a strand-flier in dotted outline. Fig. 6 is a transverse section of said pin, and Fig. 7 is a plan thereof. Fig. 8 is a detail sectional view of a part of the spindle-base and stop mechanism. Fig. 9 is a view of the upper part of the main spindle and the laying-top. Fig. 10 is a horizontal section of said spindle and an inverted plan of the laying-top. Fig. 11 is a top view of said laying-top. Fig. 12 is a perspective view of one of the tension devices of the strand-fliers. Fig. 13 is an elevation of part of a machine embodying my invention, including the driving mechanism and the complete automatic stop mechanism; and Fig. 14 is a detail view of a part of the stop mechanism. Figs. 3 to 12, inclusive, are on a larger scale than Figs. 1 and 2, while Fig. 13 is on a still smaller scale.

Similar letters of reference designate corresponding parts in all the figures.

Referring first to all the figures except Figs. 13 and 14, A designates the rail of the machine, and B designates a fixed tube or hollow post, which extends through the rail, and is rigidly secured therein by means of a shoulder, $a$, and a nut, $a'$. At the top of this tube or hollow post is formed integral with it or rigidly secured to it a sun-wheel, B', which maintains a fixed position at all times during the operation of the machine.

C designates the spindle-base, and C' designates a sleeve thereon, which surrounds the fixed tube or post B, and is free to rotate thereon, it being afforded a long and steady bearing. The lower end of the sleeve C' rests in a step-bearing, $a^2$, on top of the rail A. To the exterior of the sleeve C' is secured a driving pulley or whirl, $C^2$, and a spur-gear wheel, $C^3$, which serves to drive the take-up.

D designates the main or center spindle, at the lower end of which is a portion, D', of reduced diameter, having a long bearing in the tube or post B, and held therein by nuts $b$, screwed on its lower end.

In order to properly lubricate the long bearings of the spindle portion D' and the sleeve C' of the spindle-base, I make the top of the fixed sun-wheel B' concave or depressed, so as to form an oil-cup, $b'$, from which oil-holes $b^2$ $b^3$ lead to the interior surfaces of the tube or post and the sleeve C'. This is clearly shown in Fig. 1.

E designates a frame or spider, which is secured to the spindle D in any suitable way—as, for example, by a set screw, $c$. (Shown in Fig. 2.) It is above the fixed sun-wheel, and is large enough so that its arms extend beyond the edge of said wheel. In these arms are inserted pins $c'$, which extend downward and engage with holes $c^2$ in the spindle-base C. As here shown, these pins consist of screws fast in the frame or spider E, and having their lower ends reduced in diameter, as shown in Fig. 1. This form of connection between the spindle-base and main spindle insures their simultaneous rotation without transmitting the vibrations of the spindle-base to the spindle, and it also affords provision for readily lifting the spindle out of its bearing-sleeve.

F designates strand-fliers, which carry bobbins or spools F', having their pins or axes $F^2$ extending transversely to the axes of the fliers. The lower journals, $d$, of these fliers are supported in suitable bearings in the spindle-base C, and their upper journals, $d'$, are supported in a frame or spider, E', fast upon the spindle D, so as to rotate therewith. On the lower ends of the fliers are spur planet pinions or wheels, G, which gear into intermediate pinions or wheels, G', the latter in turn gearing into the fixed sun-wheel B'. Hence it will be seen that the spindle and spindle-base, with the fliers, all rotate in one direction, while by reason of the intermediate wheels, G', the strand-fliers F are each rotated on its own axis in the opposite direction to that in which the spindle and spindle-base rotate. The intermediate wheels, G', rotate upon pins or pivots $e$, secured in the spindle-base, and transmit to the wheels G and fliers the motion which is produced by their rotation around the fixed wheel B'.

As will be clearly seen from Fig. 1, the wheels B' G G' are not all in a horizontal plane; but a concave arrangement of the wheels is adopted, and the fliers F and pivots $e$ all converge toward the upper end of the main spindle D, and are radial to the concave in which the several wheels are arranged. The bobbin-pins $F^2$ are fixed in position in the fliers, and the bobbins rotate upon them. Each pin is adapted to be introduced or inserted from one side of the flier, and has at its end a portion, $e'$, of reduced diameter, which enters the opposite side of the flier. The pin $F^2$ has in it a longitudinal groove, $e^2$, in which is secured a spring-arm, $F^3$, which is adapted to spring outward into a notch, $e^3$, in the flier F, so as to hold the pin against turning in the flier.

In the arm $F^3$ is a notch or recess, $e^4$, which engages with the flier, as shown in Fig. 5, and so prevents accidental movement of the pin lengthwise, after being inserted in place in the flier.

In the groove $e^2$ is likewise secured a spring, $e^5$, which springs outward, and, bearing against the inside of the bobbin, forms a brake to suitably retard the rotation of the latter. The spring-brake $e^5$ may be set outward by a screw, $e^6$, so as to offer more resistance to the turning of the bobbin.

At the top of each strand-flier F is a tension device, $F^4$, which consists of two jaws or blades, $f f'$, held together by a screw, $f^2$, as shown best in Fig. 12, and capable of receiving the strands $g$ between them. The corners or top edges of the jaw $f'$ are turned over at $f^3$, as shown in Fig. 12, so that the strand may not escape sidewise or laterally from between the jaws or blades, while allowing it to be drawn forward longitudinally. The resistance offered by this tension device to the movement of the strands $g$ may be varied as may be desired by manipulating the screw $f^2$.

At the top of the main or center spindle, D, is a laying-top, $D^2$, the construction of which will be best understood from Figs. 9, 10, and 11. It is of conical form, and has grooves $h$ for the reception of the strands $g$.

Any suitable take-up mechanism for the laid cord may be used; but, as such mechanism forms no part of my invention, I have not thought it necessary to show it.

I will now describe the stop-motion, which forms an important feature of my invention, and is shown in Figs. 1, 3, 4, 8, and 13.

Above the frame or spider E' and the tension devices F⁴ a hanger or spider, E², is secured fast to the spindle D and rotates therewith. The arms of this hanger or spider are bifurcated, and in each arm is a tumbler or lever, H, which is pivoted at $i$, and has grooves $i'\,i^2$ formed in opposite sides, as best shown in Fig. 3. There should be a tumbler or lever H for each strand $g$, and the strands, in running from the tension devices F⁴ to the laying-top D², are carried over or in front of the tumblers at their pivots $i$, resting in the grooves $i'$, and under or behind the end of the tumblers, resting in the grooves $i^2$. The tension on the strands $g$ will then cause the tumblers or levers H to assume upright positions, as shown in Fig. 1.

In each tumbler or lever H, above or inside the pivot $i$, is a small hole or eye, $i^3$, in which the bent end of a stop-wire, I, is secured, the wire being suspended from said tumbler or lever. The several wires I extend downward to the spindle-base C, and are there attached to pins or rods J, which fit and can slide in sockets or guides $j$ in the said spindle-base.

Above and on the spindle-base C are spring-cases $j'$, which contain springs $j^2$, bearing on collars or shoulders $j^3$ on the pins or rods J. The arrangement of the springs is best seen from Fig. 8. The springs $j^2$ are not sufficiently powerful to overcome the tension on the strands $g$, and consequently so long as the strands remain intact the tumblers or levers H are held in their approximately upright position, or in line with the strands, and the pins or rods J are held up, as shown in Fig. 1, so that they do not protrude below the sockets or guides $j$ in the spindle-base C. When, however, any strand $g$ breaks, the spring $j^2$, acting upon its stop-wire I, pulls down said wire and turns the tumbler or lever upside down, thus forcing the pin or rod J downward, so that it will protrude below its socket or guide $j$, as shown in Fig. 13, to which and to Fig. 14 I shall now solely refer. In these figures, for the sake of clearness, I only show a single stop-wire I. The rail A forms a part of the frame A' of the machine, wherein are journaled the driving-shaft K and the intermediate shaft, K'. A belt, K², transmits motion from a pulley, K³, on the driving-shaft to a pulley, K⁴, on the intermediate shaft, K', and from a pulley, K⁵, on the intermediate shaft a belt, K⁶, drives onto the pulley C², fast on the sleeve C' of the spindle-base C. The belt K² is a loose belt, and tension is put on it to cause it to drive by means of an idler wheel or pulley, $k$, carried at one end of a lever, L, which is fulcrumed at $l$, and from the opposite end of which is suspended a weight, $l'$, to balance the pulley.

In the weighted end of the lever L is a pin, $l^2$, which rests upon a second lever, L', fulcrumed at $l^3$.

To the lever L' is attached a spring, $l^4$, which tends constantly to pull it upward, and when allowed to act will raise or swing upward the said lever L', and by raising the weighted end of the lever L will depress the pulley $k$ and relieve the belt K² of tension, so that it will no longer drive, but will run slack.

In lieu of the spring $l^4$, an equivalent weight may be used for raising the lever L'.

L² designates a lever pivoted to a post, $l^5$, and adapted to swing in a horizontal plane. Upon the outer end of this lever is a shouldered catch, $l^6$, which is shown in Fig. 14 in side view, and the other end of the lever L² projects below the spindle-base C and in the circular path described by the stop pins or rods J.

As shown in Fig. 13, the parts are set for operation, the pulley $k$ being held against the belt K² by the catch $l^6$, under which the lever L² is held against the action of the spring $l^4$. When one of the strands breaks, the rod or pin J is moved downward, as shown in Fig. 13, so that as it is carried round it will strike the lever L², and by swinging it horizontally will move the catch $l^6$ away from the lever L' and release the latter. This leaves the lever L' free, and it is instantly pulled up by the spring $l^4$, thereby tilting the lever L and carrying the pulley $k$ away from the belt K², to slacken the latter and thus stop the machine. This stop-motion is very sensitive and quick in its action and will at once stop the machine when any one of the strands breaks. Of course any number of spindles may be placed on the rail A, each being separately driven.

What I claim as my invention, and desire to secure by Letters Patent, is—

1. The combination, with the spindle-support A, the fixed tube or hollow post B, and the fixed sun-wheel B', of the main spindle D, having a bearing within said tube or post, the rotary spindle-base C C', adapted to turn on the exterior of said tube or post, the wheel C², strand-fliers F, provided with planet-wheels G, and intermediate wheels, G', between said sun-wheel B' and planet-wheels G, all substantially as herein described.

2. The combination, with the main spindle, of the spindle-base and spider or frame secured to said spindle, pins on one of said parts entering holes or sockets in the other, so as to connect the said spider or frame and spindle-base, while affording provision for the ready removal of the spindle with the spider or frame upon it, and means for imparting rotary motion to the spindle-base, substantially as described.

3. The combination of the fixed tube or hollow post and the sun-wheel provided with an oil-cup in its top, and oil-holes leading from said oil-cup to the interior and exterior surfaces of said tube or post, with a main spindle having its bearing within said tube or post, a spindle-base having its bearing on the outside of said tube or post, and means for rotating said spindle and spindle-base, substantially as described.

4. The combination, with the flier F and spool or bobbin F', of the non-rotary pin F², provided with the longitudinal groove $e^2$, and the spring $e^5$, lying in said groove and forming a brake to the spool or bobbin, substantially as described.

5. The combination, with the flier F and spool or bobbin F', of the non-rotary pin F², with its groove $e^2$, the brake-spring $e^5$, and the adjusting-screw $e^6$, substantially as described.

6. The combination, with the flier F and spool or bobbin F', of the non-rotary pin F², having the longitudinal groove $e^2$, and the spring-catch F³, arranged in said groove, and serving to secure said pin against longitudinal movement in the flier, substantially as described.

7. The combination, with a main spindle and strand-fliers and devices for supporting them and imparting to them a sun-and-planet motion, of a slack driving-belt and a tension device for acting thereon, a horizontal swinging lever, a catch and devices through which the catch acts to retain the belt under tension, drop rods or pins, and devices upon which the strands act to retain said drop rods or pins in an elevated position, and which, on the breaking or giving out of a strand, will allow its drop rod or pin to descend, so as to act upon the aforesaid lever to stop the machine, substantially as described.

8. The combination, with the main spindle D, strand-fliers F, and means for supporting and operating them, of the drop rods or pins J, and drop-wires I, and tumblers or levers H, for holding said rods or pins elevated by the strands, and devices upon which said rods or pins act on the breakage of the strands to effect the stoppage of the machine, substantially as described.

JOSEPH W. MORTON.

Witnesses:
W. K. SELTZER,
EMMA H. SELTZER.